(12) United States Patent
Sakurada et al.

(10) Patent No.: US 11,179,896 B2
(45) Date of Patent: Nov. 23, 2021

(54) BONDED BODY

(71) Applicant: DENSO CORPORATION, Kariya (JP)

(72) Inventors: Takashi Sakurada, Kariya (JP); Masaya Nakamura, Kariya (JP); Shota Terachi, Kariya (JP)

(73) Assignee: DENSO CORPORATION, Kariya (JP)

(*) Notice: Subject to any disclaimer, the term of this patent is extended or adjusted under 35 U.S.C. 154(b) by 174 days.

(21) Appl. No.: 16/546,503

(22) Filed: Aug. 21, 2019

(65) Prior Publication Data

US 2019/0375165 A1  Dec. 12, 2019

Related U.S. Application Data

(63) Continuation of application No. PCT/JP2018/004034, filed on Feb. 6, 2018.

(30) Foreign Application Priority Data

Mar. 31, 2017  (JP) .............................. JP2017-069611

(51) Int. Cl.
*B29C 65/06* (2006.01)
*B29C 65/00* (2006.01)
*B29L 31/00* (2006.01)

(52) U.S. Cl.
CPC ............ *B29C 65/06* (2013.01); *B29C 66/301* (2013.01); *B29C 66/322* (2013.01); *B29L 2031/7492* (2013.01)

(58) Field of Classification Search
CPC ..... B29C 65/06; B29C 66/301; B29C 66/322; B29C 66/71; B29C 65/7829; B29C 65/069; B29C 65/0618; B29C 66/12443; B29C 66/73921; B29C 66/1312; B29C 66/54; B29L 2031/7492; F02M 35/1036; F02M 35/104; B29K 2105/0079

See application file for complete search history.

(56) References Cited

U.S. PATENT DOCUMENTS

2004/0200450 A1   10/2004   Tanikawa et al.

FOREIGN PATENT DOCUMENTS

| JP | H08142197 A | 6/1996 | |
|---|---|---|---|
| JP | 2002364469 A | * 12/2002 | ........... B29C 66/547 |
| JP | 2004316468 A | 11/2004 | |
| JP | 2012219765 A | 11/2012 | |

\* cited by examiner

*Primary Examiner* — Michael N Orlando
*Assistant Examiner* — Christopher W Raimund
(74) *Attorney, Agent, or Firm* — Harness, Dickey & Pierce, P.L.C.

(57) ABSTRACT

A bonded body is formed of a first member and a second member. The first member has a first base portion and a first welded portion which protrudes from the first base portion toward the second member side. The second member has a second base portion and a second welded portion which protrudes from the second base portion toward the first member side. In a first region of the joint portion, a first rib formed so as to project from the first base portion toward the second member side covers the first welded portion and the second welded portion from the side. In a second region different from the first region, a second rib formed so as to project from the second base portion toward the first member side covers the first welded portion and the second welded portion from the side.

4 Claims, 13 Drawing Sheets

BONDED BODY

CROSS REFERENCE TO RELATED APPLICATIONS

This application is a continuation application of International Patent Application No. PCT/JP2018/004034 filed on Feb. 6, 2018, which designated the U.S. and based on and claims the benefits of priority of Japanese Patent Application No. 2017-069611 filed on Mar. 31, 2017. The entire disclosure of all of the above applications is incorporated herein by reference.

TECHNICAL FIELD

The present disclosure relates to a bonded body formed by vibration welding a plurality of members.

BACKGROUND

In a case where a product having a relatively complicated shape is formed by resin, a plurality of members are formed in advance, and the product (bonded body) is formed by a vibration welding of these members.

SUMMARY

The present disclosure provides a bonded body that is capable of preventing a phenomenon in which the burr protrudes to the outside of the rib.

The bonded body according to the present disclosure is a bonded body formed by vibration welding a first member and a second member. The first member includes a first base portion extending along an edge on a second member side of the first member, and a first welded portion projecting from the first base portion toward the second member side. The second member includes a second base portion extending along an edge on a first member side of the second member and arranged to face the first base portion, and a second welded portion projecting from the second base portion toward the first member side and having a tip end vibration welded to a tip end of the first welded portion. A width of the first welded portion is larger than a width of the second welded portion. In a first region of the portion where the first member and the second member are joined, a first rib formed in the first member so as to protrude from the first base portion toward the second member side at a position separated from the first welded portion, covers the first welded portion and the second welded portion from the side. In a second region different from the first region in the portion where the first member and the second member are joined, a second rib formed in the second member so as to protrude from the second base portion to the first member side at a position separated from the second welded portion, covers the first welded portion and the second welded portion from the side.

DETAILED DESCRIPTION

Figure 1:
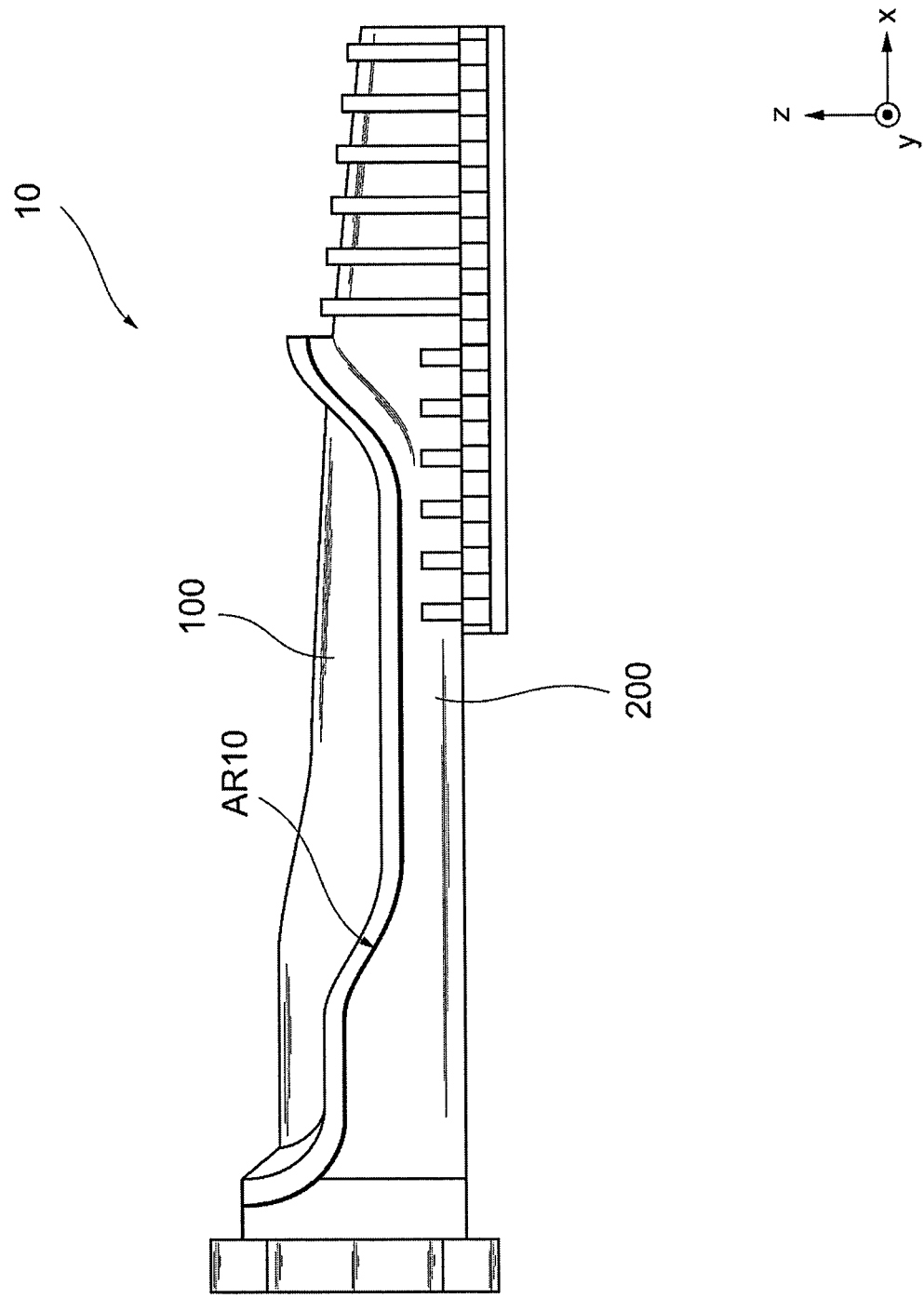
FIG. 1 is a side view showing an entire structure of a bonded body according to a first embodiment.

Hereinafter, the present embodiments will be described with reference to the attached drawings. In order to facilitate the ease of understanding, the same reference numerals are attached to the same constituent elements in each drawing where possible, and redundant explanations are omitted.

Figure 2:
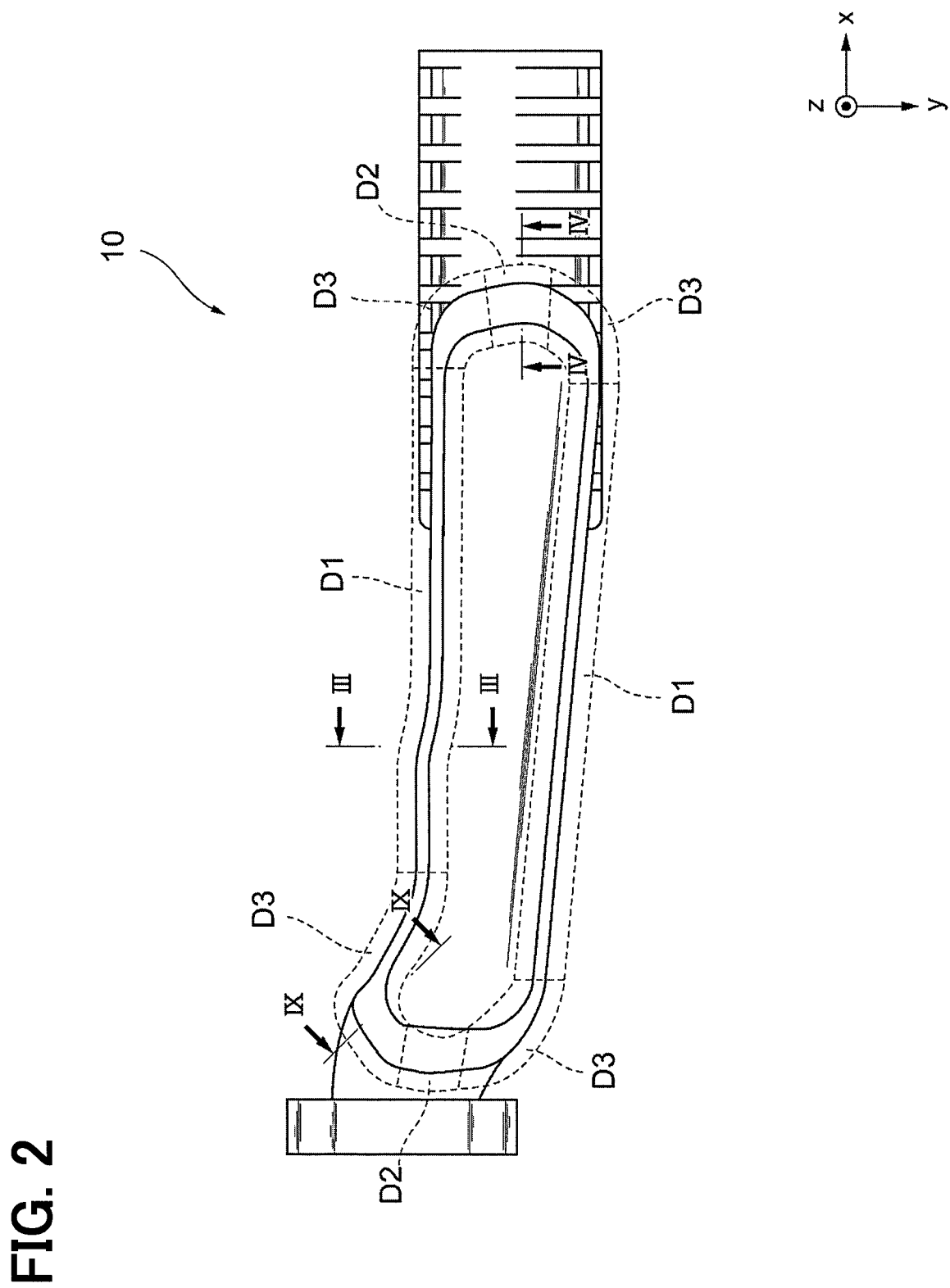
FIG. 2 is a top view showing the entire structure of the bonded body according to the first embodiment.

The bonded body 10 according to a first embodiment is a component that constitutes a part of an intake manifold (the whole is not shown in the figure) provided in a vehicle. As shown in FIGS. 1 and 2, the bonded body 10 is relatively complex in shape to optimize the flow of air through an interior. Therefore, the bonded body 10 is formed by vibration welding a first member 100 and a second member 200 which are previously formed by injection molding of resin.

Examples of the resin to be used as the material of the bonded body 10 include thermoplastic resins such as polyamide, polypropylene, polyphenylene sulfide, polyethylene, polybutylene terephthalate, polycarbonate, polyether ether ketone, polyetherimide, polyethylene terephthalate, polymethyl methacrylate, polyacetal, polyphenylene oxide, polystyrene, polyvinyl chloride, acrylonitrile styrene, liquid crystal polymer.

In the following description, a longitudinal direction of the bonded body 10, namely a direction from the left side to the right side in FIG. 1, is defined as a x direction, and a x axis is set along the same direction in each of the drawings. In addition, a direction perpendicular to the x direction, that is, a direction from the back side to the front side in FIG. 1 is referred to as a y direction, and a y axis is set along the same direction in each of the drawings. Furthermore, a direction perpendicular to both the x direction and the y direction, that is, the direction from the lower side to the upper side in FIG. 1 is a z direction, and a z axis is set along the same direction in each of the drawings.

As shown in FIG. 2, the portion of the bonded body 10 to which the first member 100 and the second member 200 are joined is formed to have an annular shape as a whole. Hereinafter, a part in which the first member 100 and the second member 200 are joined to each other and the region in the vicinity thereof are divided into a first region D1, a second region D2, and a connection region D3, and the respective regions are described below.

The first region D1 is a region where the direction in which the joint portion between the first member 100 and the second member 200 extends is perpendicular to the vibration direction at the time of the vibration welding, when the bonded body 10 is viewed along a direction (i.e, −z direction) from the first member 100 toward the second member 200. In the present embodiment, the vibration direction is a direction along the y axis. Therefore, the first region D1 is a region extending along the left-right direction in FIG. 2, and exists at two locations in the vertical direction in FIG. 2. The first region D1 may be a region where the direction in which the joint portion between the first member 100 and the second member 200 extends is exactly perpendicular to the vibration direction, but may be a region where the direction is substantially perpendicular to the vibration direction.

The second region D2 is a region where the direction in which the joint portion between the first member 100 and the second member 200 extends is parallel to the vibration direction at the time of the vibration welding, when the bonded body 10 is viewed along a direction (i.e., −z direction) from the first member 100 toward the second member 200. Therefore, the first region D1 is a region extending along the vertical direction in FIG. 2, and exists at two locations in the left-right direction in FIG. 2. The second region D2 may be a region where the direction in which the joint portion between the first member 100 and the second member 200 extends is exactly parallel to the vibration direction, but may be a region where the direction is substantially parallel to the vibration direction.

The connection region D3 is a region connecting the first region D1 and the second region D2 in the portion where the first member 100 and the second member 200 are joined. In the present embodiment, two first regions D1 and two second regions D2 exist, so there are a total of four connection regions D3.

Figure 3:
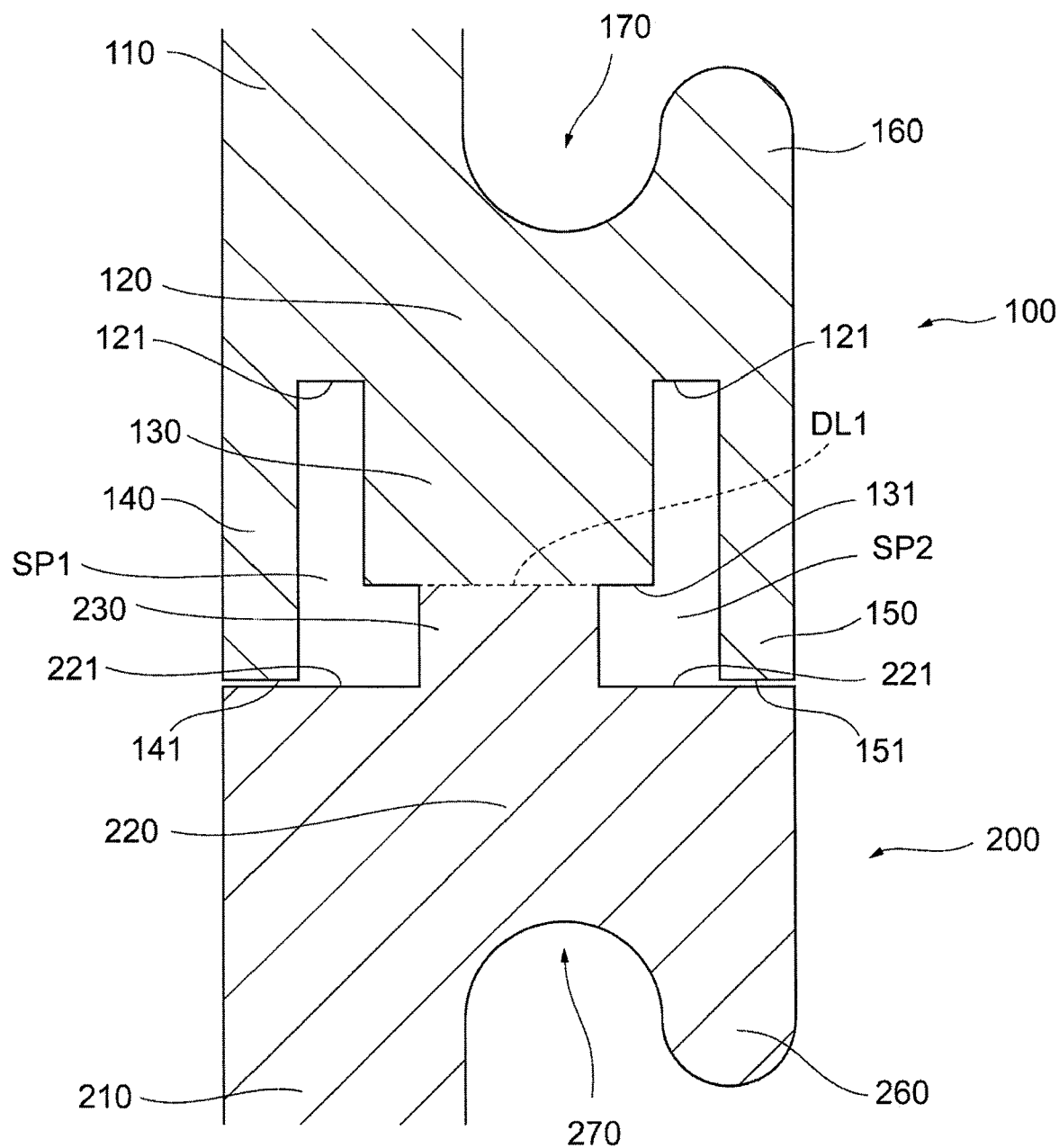
FIG. 3 is a cross-sectional view taken along the line III-III in FIG. 2.
Figure 3:
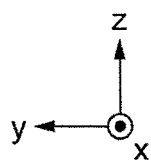

FIG. 3 schematically shows the III-III cross section of FIG. 2. The shape of the first member 100 in the first region D1 will be described with reference to FIG. 3. As shown in FIG. 3, in a vicinity of an end portion of the first member 100 adjacent to the second member 200 side, a first pipe wall 110, a first base portion 120, a first welded portion 130, and a pair of first ribs 140, 150 are formed. The portion of the first member 100 shown in FIG. 3 is also referred to as a "bonding portion" which is connected to the second member 200.

The first pipe wall 110 is a wall that forms an air passage through which air passes, and occupies most of the first member 100.

The first base portion 120 is formed so as to protrude from the end of the first pipe wall 110 closest to the second member 200 toward the outer side (the −y direction side in FIG. 3) of the bonded body 10. The first base portion 120 is formed so as to extend along the edge on the second member 200 side of the first member 100 (along the x-axis in FIG. 3). Here, the "edge on the second member 200 side" refers to the end on the second member 200 side of the first pipe wall 110.

A first projecting portion 160 projecting toward the z direction side is formed at an end portion on the −y direction side of the first base portion 120. Thus, a first recess 170 is formed between the first projecting portion 160 and the first pipe wall 110 so as to recede in the −z direction. The first recess 170 receives a jig for fixing the first member 100 to a welding device (not shown) when the vibration welding to be described later is performed.

The first welded portion 130 is formed to protrude from an end surface 121 on the −z direction side of the first base portion 120 toward the second member 200 side (the −z direction side). A second welded portion 230 (to be described later) of the second member 200 is joined to the distal end surface 131 of the first welded portion 130 by the vibration welding. In FIG. 3, a joint surface for vibration welding, that is, a surface which is substantially a boundary between the first welded portion 130 and the second welded portion 230 is indicated by a dotted line DL1.

The first rib 140 is a plate-like portion formed so as to project from the end on the y direction side of the end surface 121 toward the second member 200 (the −z direction side). The first rib 140 is formed so as to cover the first welded portion 130 and the second welded portion 230 which are bonded to each other from the side (the y direction side). The distal end surface 141 of the first rib 140 faces the end surface 221 on the z direction side of the second member 200, and a slight gap is formed between the distal end surface 141 and the end surface 221. The first rib 140 is formed at a position separated from the first welded portion 130 in the y direction. Therefore, a space SRI is formed inside the first rib 140. Alternatively, the distal end surface 141 of the first rib 140 may be in contact with the end surface 221.

The first rib 150 is a plate-like portion formed so as to project from the end on the −y direction side of the end surface 121 toward the second member 200 (the −z direction side). The first rib 150 is formed so as to cover the first welded portion 130 and the second welded portion 230 which are bonded to each other from the side (the −y direction side). The distal end surface 151 of the first rib 150 faces the end surface 221 of the second member 200, and a slight gap is formed between the distal end surface 151 and the end surface 221. The first rib 150 is formed at a position separated from the first welded portion 130 in the −y direction. Therefore, a space SP2 is formed inside the first rib 150. Alternatively, the distal end surface 151 of the first rib 150 may be in contact with the end surface 221.

The shape of the second member 200 in the first region D1 will be described with reference to FIG. 3. A second pipe wall 210, a second base portion 220, and a second welded portion 230 are formed in the vicinity of the end of the second member 200 on the first member 100 side. The portion of the second member 200 shown in FIG. 3 is also referred to as a "bonding portion" which is connected to the first member 100.

The second pipe wall 210 is a wall that forms an air passage through which air passes, and occupies most of the second member 200.

The second base portion 220 is formed so as to protrude from the end of the second pipe wall 210 closest to the first member 100 toward the outer side (the −y direction side in FIG. 3) of the bonded body 10. The second base portion 220 is disposed to face the first base portion 120 described above. The second base portion 220 is formed so as to extend along the edge on the first member 100 side of the second member 200 (along the x-axis in FIG. 3). Here, the "edge on the first member 100 side" refers to the end on the first member 100 side of the second pipe wall 210.

The distal end surface 141 of the first rib 140 and the distal end surface 151 of the first rib 150 are opposed to the end surface 221 on the z direction side of the second base portion 220.

A second projecting portion 260 projecting toward the −z direction side is formed at an end portion on the −y direction side of the second base portion 220. Thus, a second recess 270 is formed between the second projecting portion 260 and the second pipe wall 210 so as to recede in the −z direction. The second recess 270 receives a jig for fixing the second member 200 to a welding device (not shown) when the vibration welding to be described later is performed.

The second welded portion 230 is formed to protrude from an end surface 221 of the second base portion 220 toward the first member 100 side (the z direction side). The end portion on the z direction side of the second welded portion 230 is joined to the distal end surface 131 of the first welded portion 130 by the vibration welding, as described above. The width (dimension along the y-axis) of the second welded portion 230 in the cross section of FIG. 3 is smaller than the width (dimension along the y axis) of the first welded portion 130 in the same cross section of FIG. 3. Further, the center of the second welded portion 230 in the y direction is substantially coincident with the center of the first welded portion 130 in the same direction.

The structure of the joint portion in the first region D1 shown on the lower side in FIG. 2 has the same structure as that described above. Specifically, the structure shown in FIG. 3 is bilaterally symmetrical. Therefore, the specific illustration and description thereof will be omitted.

Figure 4:
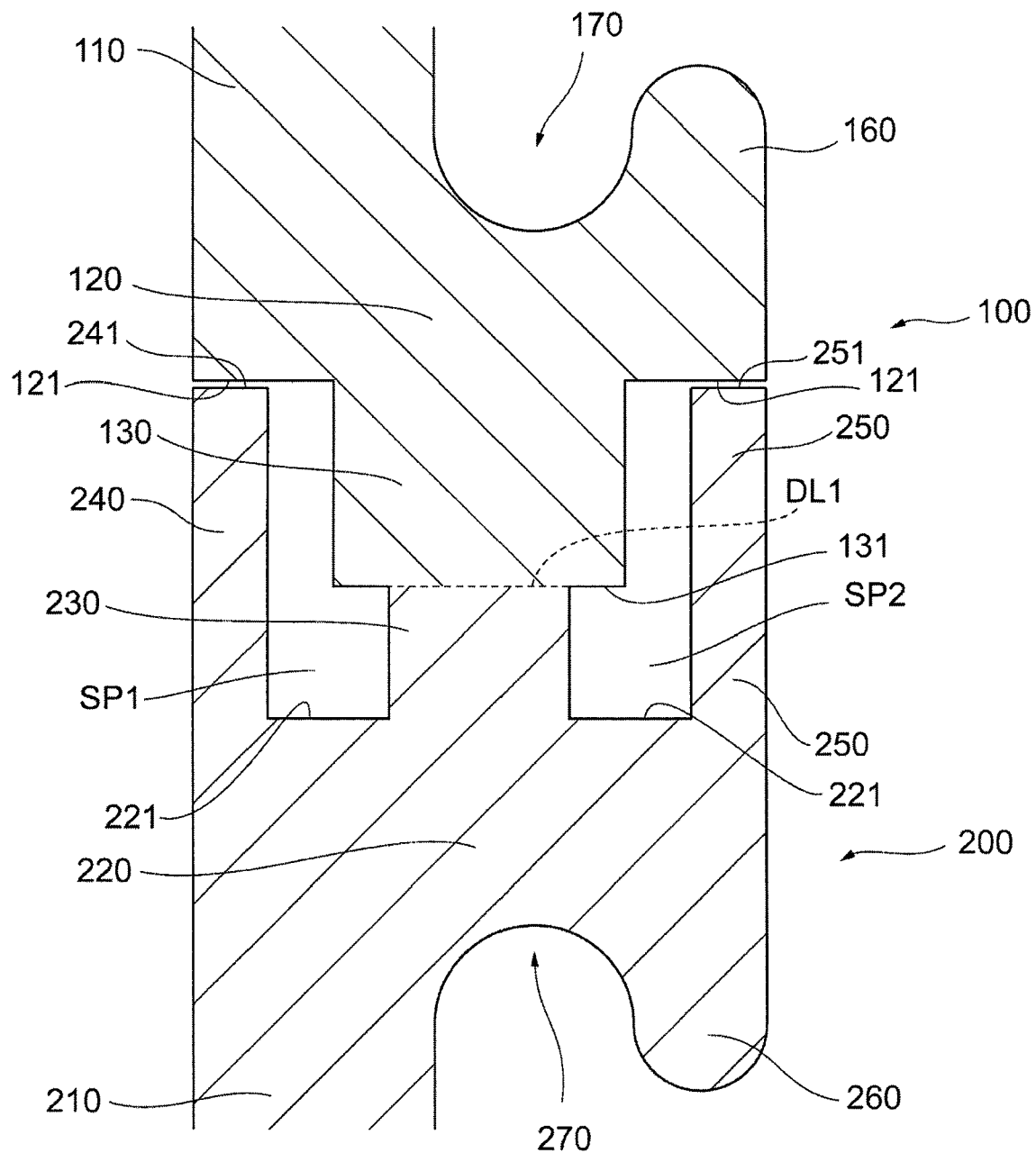
FIG. 4 is a cross-sectional view taken along line IV-IV of FIG. 2.
Figure 4:
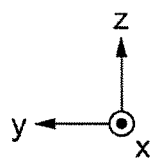

FIG. 4 schematically shows the IV-IV cross section of FIG. 2. The shape of the first member 100 in the second region D2 will be described with reference to FIG. 4. The first pipe wall 110, the first base portion 120, and the first welded portion 130 are also formed in the first member 100 in the second region D2. These shapes are the same as the respective shapes (FIG. 3) in the first region D1. However, the pair of first ribs 140 and 150 are not formed on the first member 100 in the second region D2.

The shape of the second member 200 in the first region D1 will be described with reference to FIG. 4. A second pipe wall 210, a second base portion 220, and a second welded portion 230 are also formed in the second member 200 in the second region D2. These shapes are the same as the respective shapes (FIG. 3) in the first region D1. In addition to the above, a pair of second ribs 240 and 250 are formed on the second member 200 in the second region D2.

The second rib 240 is a plate-like portion formed so as to protrude from the end on the −x direction side of the end surface 221 of the second base portion 220 toward the first member 100 (the z direction side). The second rib 240 is formed so as to cover the first welded portion 130 and the second welded portion 230 which are bonded to each other from the side (the −x direction side). The distal end surface 241 of the second rib 240 faces the end surface 121 of the first base portion 120, and a slight gap is formed between the distal end surface 241 and the end surface 121. The second rib 240 is formed at a position separated from the second welded portion 230 in the −x direction. Therefore, a space SP1 is formed inside the second rib 240. Alternatively, the distal end surface 241 of the second rib 240 may be in contact with the end surface 121.

The second rib 250 is a plate-like portion formed so as to protrude from the end on the x direction side of the end surface 221 of the second base portion 220 toward the first member 100 (the z direction side). The second rib 250 is formed so as to cover the first welded portion 130 and the second welded portion 230 which are bonded to each other from the side (the x direction side). The distal end surface 251 of the second rib 250 faces the end surface 121 of the first base portion 120, and a slight gap is formed between the distal end surface 241 and the end surface 121. The second rib 250 is formed at a position separated from the second welded portion 230 in the x direction. Therefore, a space SP2 is formed inside the second rib 250. Alternatively, the distal end surface 251 of the second rib 250 may be in contact with the end surface 121.

The structure of the joint portion in the second region D2 shown on the left side in FIG. 2 has the same structure as that described above. Specifically, the structure shown in FIG. 4 is bilaterally symmetrical. Therefore, the specific illustration and description thereof will be omitted.

A process in which the first member 100 and the second member 200 are joined by the vibration welding will be described below. First, the process of bonding in the first region D1 will be described with reference to FIGS. 5 and 6.

Figure 5:
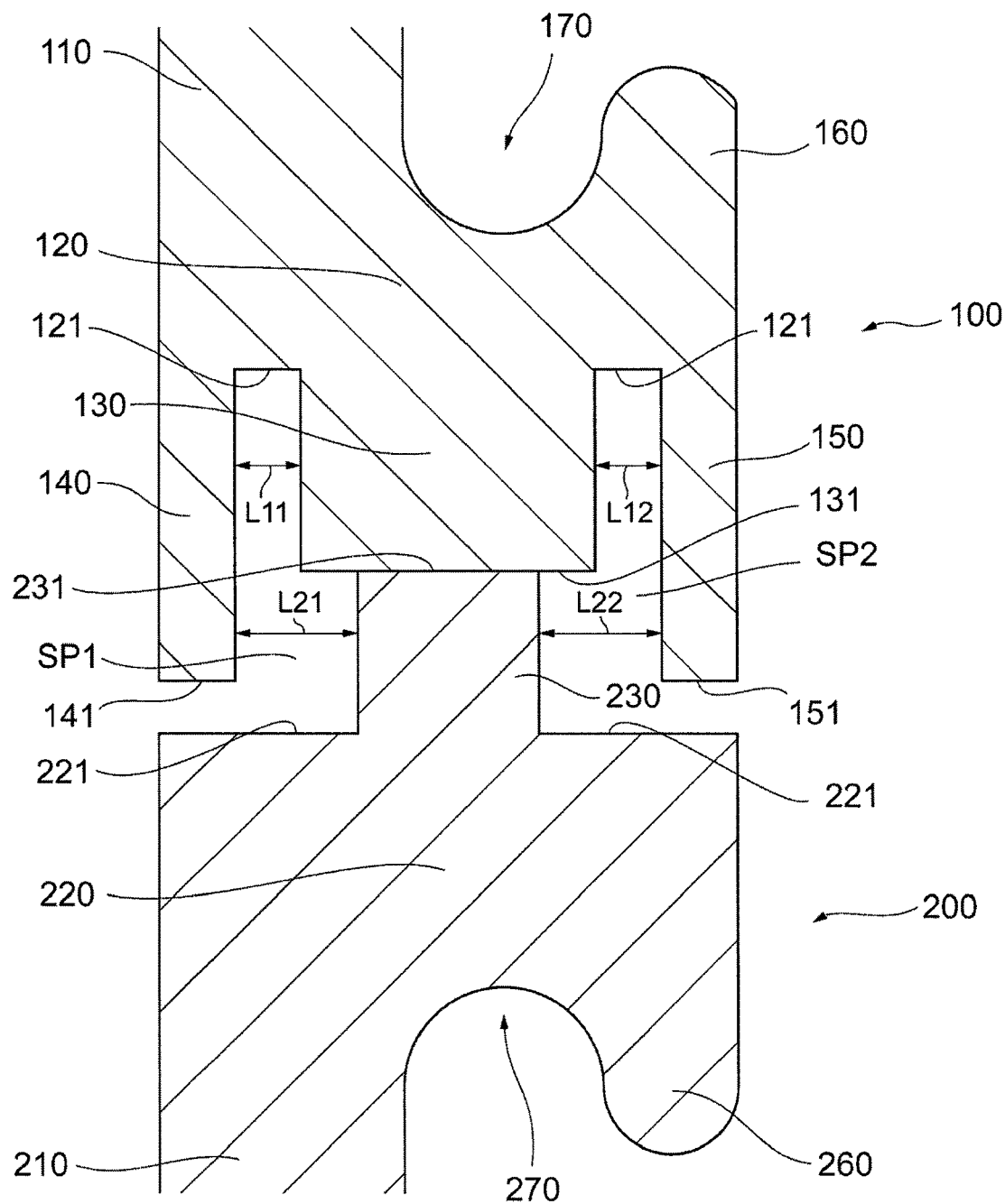
FIG. 5 is a diagram showing a state of the cross section of FIG. 3 immediately before a vibration welding is performed.
Figure 5:
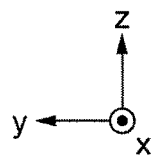

FIG. 5 shows a state in the cross section of FIG. 3 immediately before vibration welding is performed. At this time, the distal end surface 231 of the second welded portion 230 is in contact with the distal end surface 131 of the first welded portion 130. Although the first member 100 and the second member 200 arranged as shown in FIG. 4 are held by the jig of the welding device, the welding device and the jig are not shown in FIG. 5.

Before the vibration welding is performed, the dimension of the second welded portion 230 along the z axis is larger than the dimension shown in FIG. 3. Therefore, as shown in FIG. 5, the distal end surface 141 of the first rib 140 and the end surface 221 of the second base portion 220 are spaced apart from each other. Similarly, the distal end surface 151 of the first rib 150 and the end surface 221 of the second base portion 220 are also spaced apart from each other.

When the vibration welding is started, the vibration is applied to at least one of the first member 100 or the second member 200. The direction of the vibration is a direction along the y-axis as described above. Therefore, the relative positional relationship along the y direction between the first member 100 and the second member 200 periodically changes due to the above-mentioned vibration.

Figure 6:
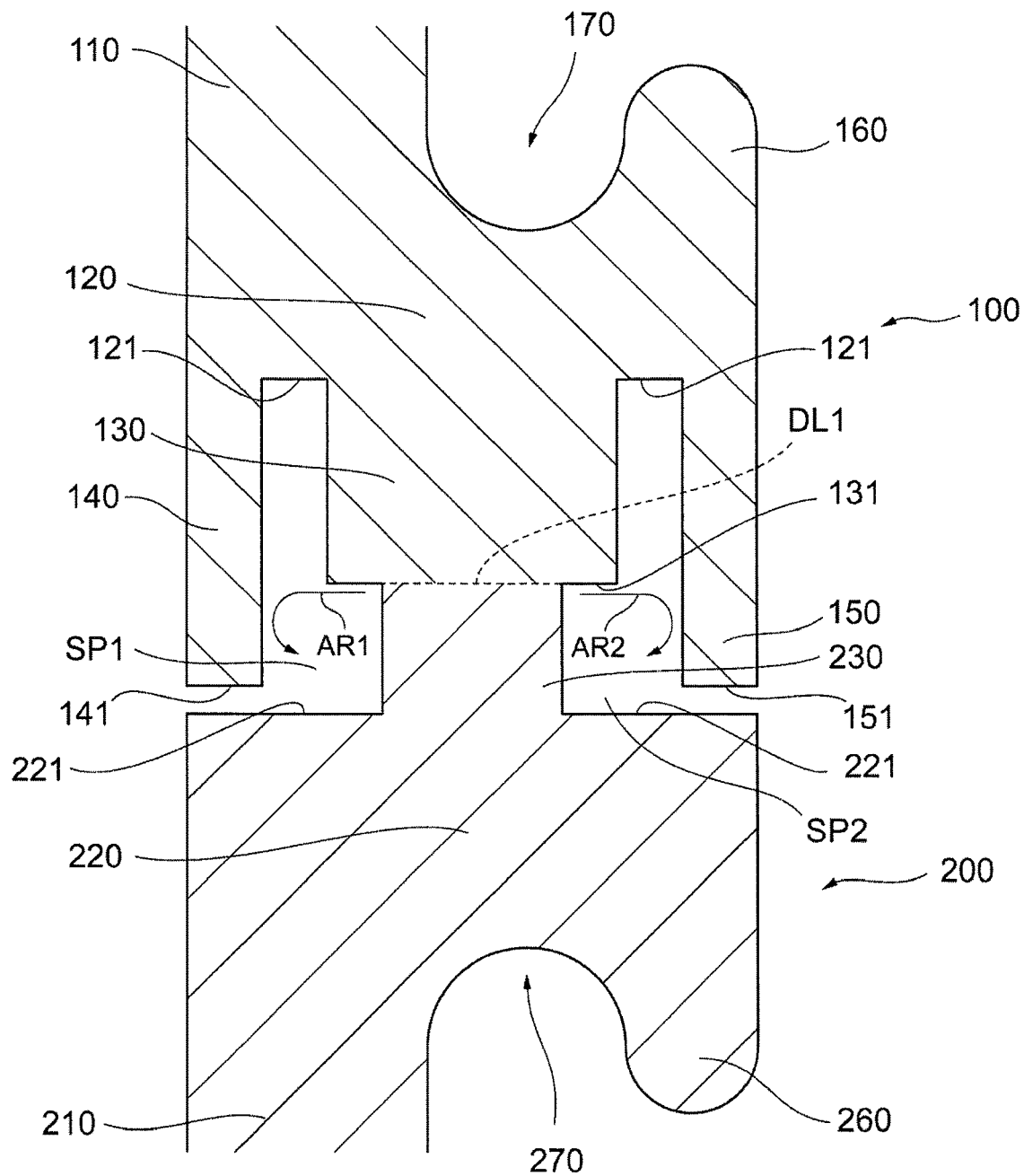
FIG. 6 is a diagram showing the state of the cross section of FIG. 3 while vibration welding is being performed.
Figure 6:
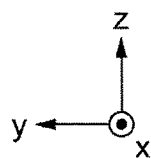

At this time, since frictional heat is generated between the first welded portion 130 and the second welded portion 230 which are vibrating in a state of being in contact with each other, each of the contact portions are melted by the frictional heat. The length of the second welded portion 230 is gradually shortened by being pressed against the first welded portion 130 in a state in which the distal portion is melted. FIG. 6 shows a state during the vibration welding. As the second welded portion 230 becomes shorter, the distance between the distal end surface 141 and the end surface 221 and the distance between the distal end surface 151 and the end surface 221 become smaller gradually.

In the present embodiment, as described above, the width of the second welded portion 230 is smaller than the width of the first welded portion 130. Therefore, while the vibration welding is being performed, the entire distal end surface 231 of the second welded portion 230 is always in contact with the distal end surface 131 of the first welded portion 130. Thereby, it is prevented that a bonding failure arises near an outer peripheral part of the joint portion.

When the vibration welding is performed, a part of the resin melted by the frictional heat becomes burr and grows so as to extend outward from the contact portion. The extending direction of the burr in the first region D1 is the direction of the vibration applied to the first member 100 or the like (that is, the direction along the y axis). That is, the burr grows from the contact portion between the first welded portion 130 and the second welded portion 230 to the left and right directions of FIG. 6 along the distal end surface 131.

In FIG. 6, the direction in which the burr grows in the space SP1 in the first region D1 is indicated by an arrow AR1. Further, the direction in which the burr grows in the space SP2 in the first region D1 is indicated by an arrow AR2. The burr grown in the space SP1 extends along the y direction from the contact portion, and then the burr hits the first rib 140 to change the direction. Therefore, the burr does not come out of the space SP1 and is stored in the space SP1. Similarly, the burr grown in the space SP21 extends along the −y direction from the contact portion, and then the burr hits the first rib 150 to change the direction. Therefore, the burr does not come out of the space SP2 and is stored in the space SP2. In FIG. 3, the illustration of the burrs accommodated in the spaces SP1 and SP2 is omitted. The same applies to FIG. 4 and also to FIGS. 9, 10, and 11 described later.

It is preferable that the size of the gap formed between the distal end surface 141 of the first rib 140 and the second member 200 is such that the burr in the space SP1 does not protrude to the outside. Similarly, it is preferable that the size of the gap formed between the distal end surface 151 of the first rib 150 and the second member 200 is such that the burr in the space SP2 does not protrude to the outside.

The first welded portion 130 and the second welded portion 230 are integrally formed by being pressed against each other in a state in which the respective distal end surface are melted. When the vibration is stopped, the resin melted by the frictional heat returns to a solid state, and the first welded portion 130 and the second welded portion 230 are bonded to each other.

By the way, when reducing the dimension in the thickness direction of the joint portion (FIG. 3) in the first region D1, the distance L11 (see, FIG. 5) between the first welded portion 130 and the first rib 140, and the distance L12 (see, FIG. 5) between the first welded portion 130 and the first rib 150 is further reduced. The distances L11 and L12 do not change in magnitude due to vibration. Therefore, even if the distances L11 and L12 are made smaller for reducing the size, the movable range of vibration does not become smaller.

When the vibration welding is performed, the distance L21 (see, FIG. 5) between the side surface of the second welded portion 230 and the first rib 140 periodically changes. In other words, the state in which the side surface of the second welded portion 230 approaches the first rib 140 and the state in which the side surface of the second welded portion 230 is away from the first rib 140 are repeated. Similarly, when the vibration welding is performed, the distance L22 (see, FIG. 5) between the side surface of the second welded portion 230 and the first rib 150 periodically changes. In other words, the state in which the side surface of the second welded portion 230 approaches the first rib 150 and the state in which the side surface of the second welded portion 230 is away from the first rib 150 are repeated.

In the present embodiment, the portion where the distance to the first ribs 140 and 150 varies as described above is the second welded portion 230 having a narrow width. Therefore, the distances L21 and L22 are relatively large.

When the distances L11 and L12 are reduced as described above in order to reduce the size of the bonded body 10, the distances L21 and L22 are also reduced. However, since the distances L21 and L22 are originally relatively large as described above, it is possible to maintain a state in which interference can not occur while reducing the distances L21 and L22. In this case, it should be noted that the dimensional tolerance of each part and the amplitude of vibration should be taken into consideration so as not to cause the interference.

As described above, in the first region D1, the movable range at the time of the vibration welding is sufficiently secured. Therefore, the dimension in the width direction of the joint portion can be reduced while preventing the decrease in the joint strength. When the bonded body 10 is used as a part of an intake manifold as in the present embodiment, the cross-sectional area of the air flow passage can be increased by reducing the size of the joint portion. Thereby, the pressure loss of the intake air can be reduced and the output of the engine can be improved.

Figure 7:
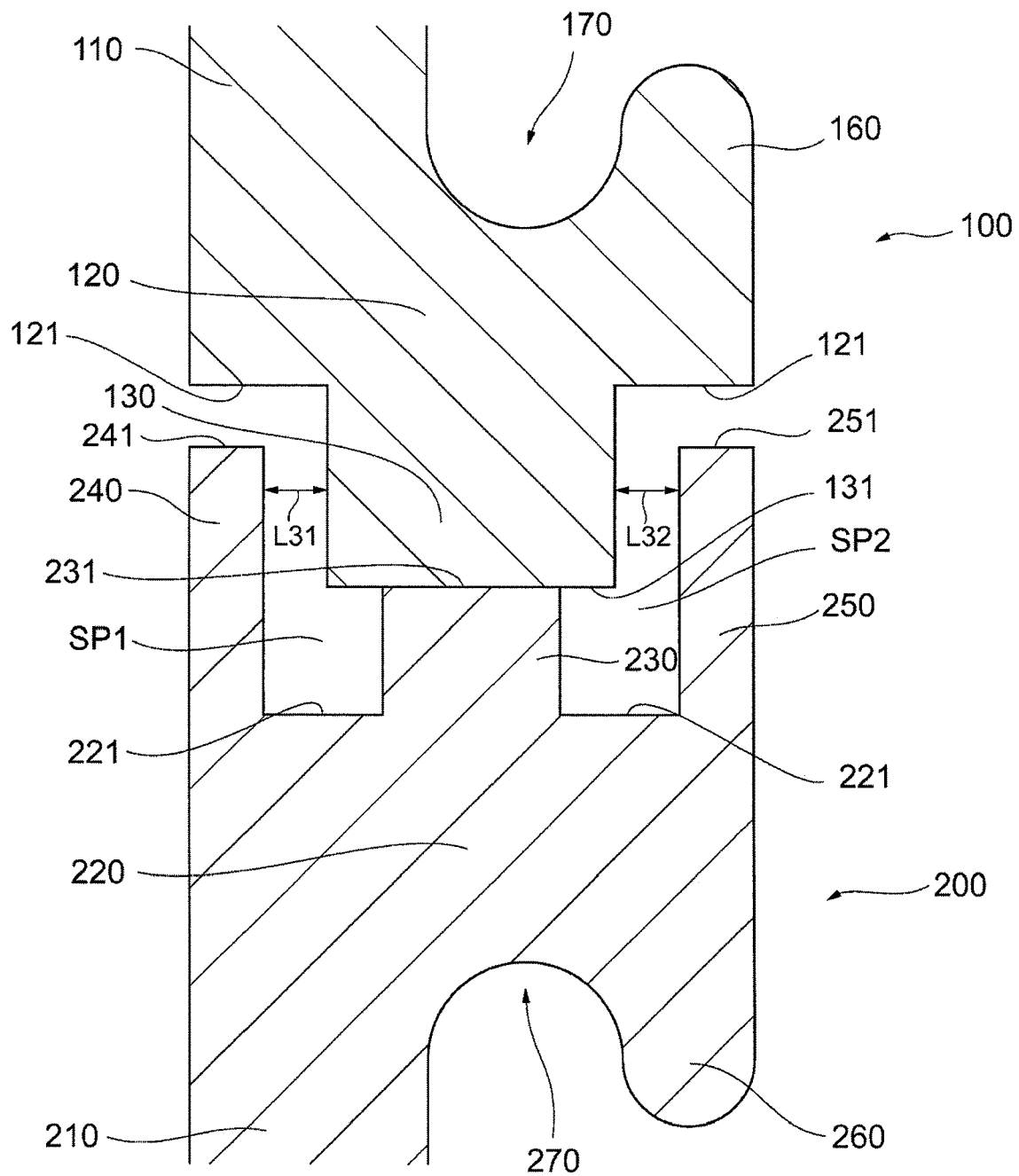
FIG. 7 is a diagram showing a state of the cross section of FIG. 4 immediately before a vibration welding is performed.
Figure 8:
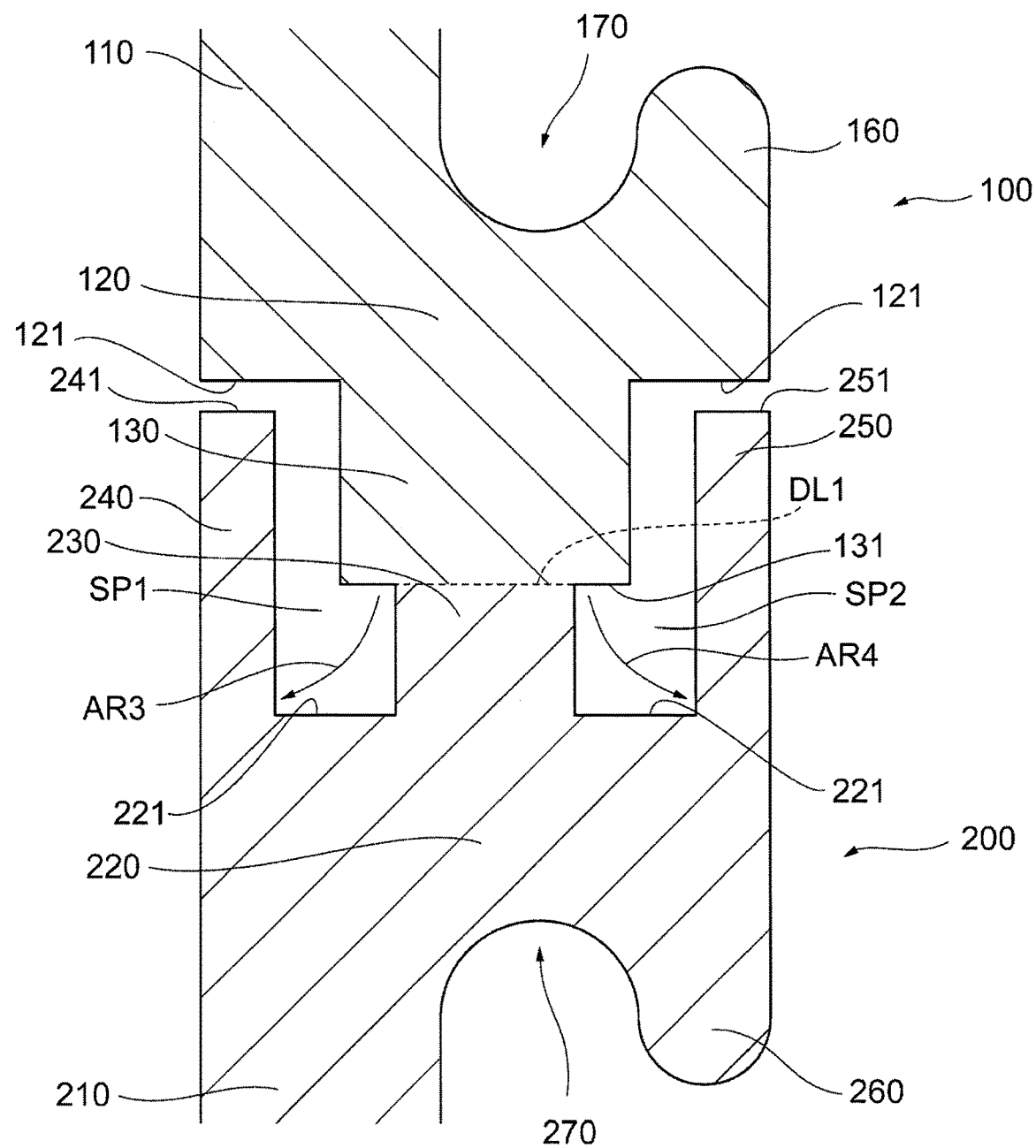
FIG. 8 is a diagram showing the state of the cross section of FIG. 4 while vibration welding is being performed.

Next, the process of bonding in the second region D2 will be described with reference to FIGS. 7 and 8. FIG. 7 shows a state in the cross section of FIG. 4 immediately before vibration welding is performed. In the same manner in the case of the first region D1 (FIG. 5), the second welded portion 230 is in a state in which the distal end surface 231 is in contact with the distal end surface 131 of the first welded portion 130. The welding device and the jig are also not shown in FIG. 7.

Before the vibration welding is performed, the dimension of the second welded portion 230 along the z axis is larger than the dimension shown in FIG. 4. Therefore, as shown in FIG. 7, the distal end surface 241 of the second rib 240 and the end surface 121 of the first base portion 120 are spaced apart from each other. Similarly, the distal end surface 251 of the second rib 250 and the end surface 121 of the first base portion 120 are also spaced apart from each other.

At the starting of the vibration welding, since frictional heat is generated between the first welded portion 130 and the second welded portion 230 which are vibrating in a state of being in contact with each other, each of the contact portions are melted by the frictional heat. The length of the second welded portion 230 is gradually shortened by being pressed against the first welded portion 130 in a state in which the distal portion is melted. FIG. 8 shows a state during the vibration welding. As the first welded portion 130 and the second welded portion 230 are melted together, the distance between the distal end surface 241 and the end surface 121 and the distance between the distal end surface 251 and the end surface 121 are both gradually decreased.

While the vibration welding is being performed, also in the second region D2, the entire distal end surface 231 of the second welded portion 230 is always in contact with the distal end surface 131 of the first welded portion 130. Thereby, it is prevented that a bonding failure arises near an outer peripheral part of the joint portion.

When the vibration welding is performed, a part of the resin melted by the frictional heat becomes burr and grows so as to extend outward from the contact portion. The direction of the vibration in the second region D2 coincides with the direction in which the joint portion between the first member 100 and the second member 200 extends. In such a case, the growth direction of the burr is not fixed to a certain direction. The burr extends in a random direction toward the range closer to the second member 200 side (that is, the −z direction side) relative to the distal end surface 231. In FIG. 8, an example of the direction in which the burr grows in the space SP1 in the second region D2 is indicated by an arrow AR3. Further, an example of the direction in which the burr grows in the space SP2 in the second region D2 is indicated by an arrow AR4.

In the second region D2, the gap formed on the distal end side of the second ribs 240 and 250 does not exist in the range in which the burr can grow (i.e, the range on the −z direction side with respect to the distal end surface 231). Therefore, even if the burr grows in any direction, the burr does not protrude to the outside of the second ribs 240 and 250. Therefore, also in the second region D2, all the burrs are accommodated in the spaces SP1 and SP2.

The first welded portion 130 and the second welded portion 230 are integrally formed by being pressed against each other in a state in which the respective distal end surface are melted. When the vibration is stopped, the resin melted by the frictional heat returns to a solid state, and the first welded portion 130 and the second welded portion 230 are bonded to each other.

When reducing the dimension in the thickness direction of the joint portion (FIG. 4) in the second region D2, the distance L31 (see, FIG. 7) between the first welded portion 130 and the second rib 240, and the distance L32 (see, FIG. 7) between the first welded portion 130 and the second rib 250 is further reduced. However, in the second region D2, the vibration direction is the depth direction (y direction) of the drawing of FIG. 7. Therefore, if the distance L31, L32 is made small, the movable range of the vibration does not become narrow.

As described above, in the bonded body 10 according to the present embodiment, by devising the arrangement of the first region D1 and the second region D2, it is possible to reduce the size of the bonded body 10 while preventing the phenomenon that burrs are projecting outside the rib.

The joint surface between the first member 100 and the second member 200 does not need to be included in a single plane (the xy plane) parallel to the vibration direction. For example, the portion indicated by an arrow AR10 in FIG. 1 extends along a direction inclined with respect to the xy plane. However, when the bonded body 10 is viewed along the direction from the first member 100 toward the second member 200, the portion is substantially perpendicular to the vibration direction (the y direction). Therefore, the said portion is a portion included in the first region D1 described above.

Figure 9:
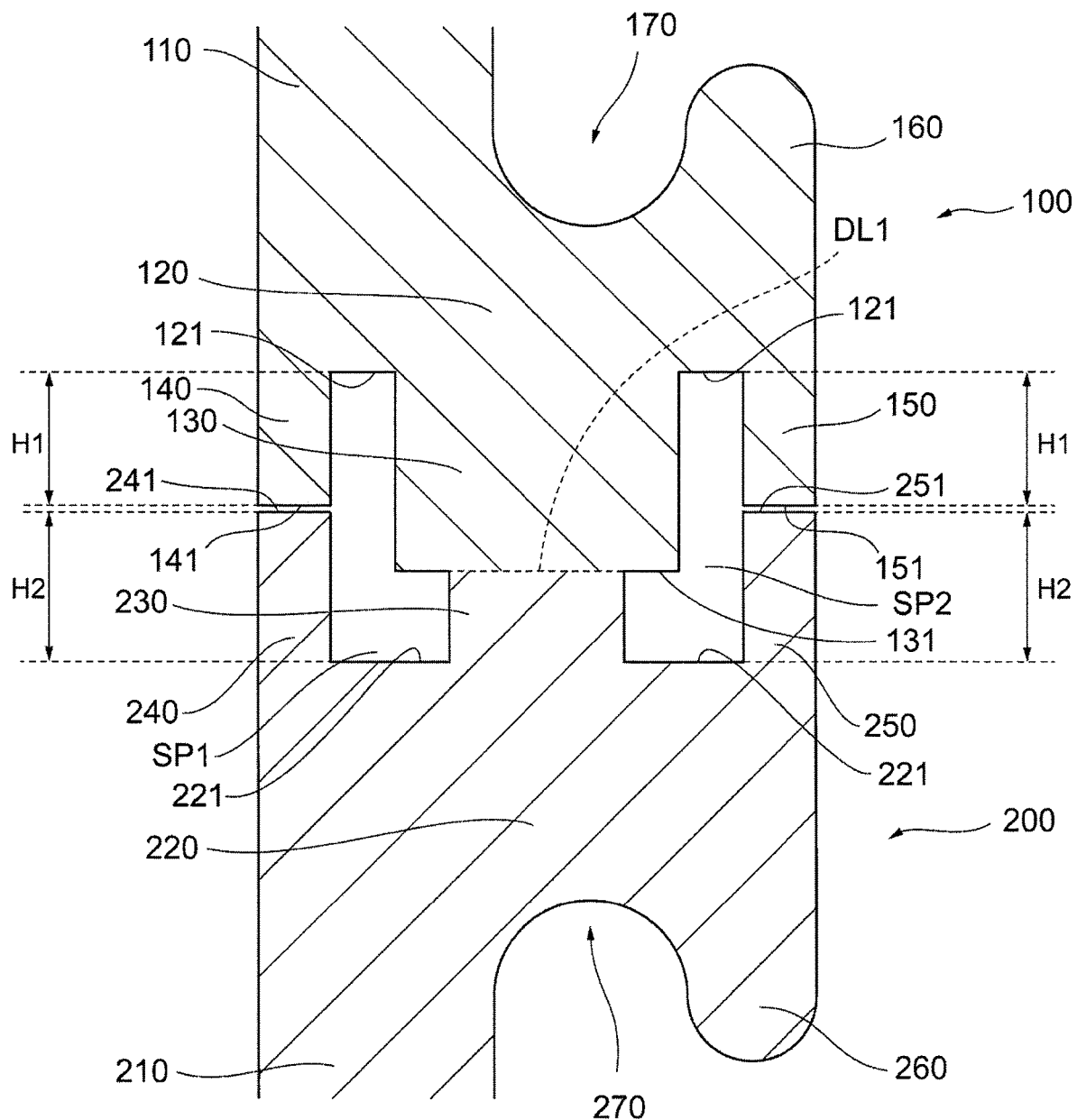
FIG. 9 is a cross-sectional view taken along line IX-IX of FIG. 2.

FIG. 9 schematically shows the IX-IX cross section of FIG. 2. The shape of the first member 100 in the connection region D3 will be described with reference to FIG. 9. The first pipe wall 110, the first base portion 120, and the first welded portion 130 are also formed in the first member 100 in the connection region D3. These shapes are the same as the respective shapes (FIG. 3) in the first region D1.

Similarly to the case of the first region D1, the pair of first ribs 140 and 150 are also formed on the first member 100 in the connection region D3. However, the amount of protrusion (dimension along the z axis) is shorter than the amount of protrusion in the first region D1. In FIG. 9, the protrusion amount of each of the first ribs 140 and 150 is shown as H1.

The shape of the second member 200 in the connection region D3 will be described with reference to FIG. 9. The second pipe wall 210, the second base portion 220, and the second welded portion 230 are also formed in the second member 200 in the connection region D3. These shapes are the same as the respective shapes (FIG. 4) in the second region D2.

Similarly to the case of the second region D2, the pair of second ribs 240 and 250 are also formed on the second member 200 in the connection region D3. However, the amount of protrusion (dimension along the z axis) is shorter than the amount of protrusion in the second region D2. In FIG. 9, the protrusion amount of each of the second ribs 240 and 250 is shown as H2. The distal end surface 241 of the second rib 240 faces the distal end surface 141 of the first rib 140, and a slight gap is formed between the distal end surface 241 and the distal end surface 141. The distal end surface 251 of the second rib 250 faces the distal end surface 151 of the first rib 150, and a slight gap is formed between the distal end surface 251 and the distal end surface 151.

In the connection region D3, the amount of protrusion of the first ribs 140 and 150 and the amount of protrusion of the second ribs 240 and 250 are not uniform as a whole, and are different depending on a place. Specifically, the protrusion amount H1 of the first ribs 140 and 150 gradually decreases as going from the first region D1 side to the second region D2 side. In the portion of the connection region D3 closest to the first region D1, the protrusion amount H1 of the first ribs 140 and 150 is maximum, and is in the state shown in FIG. 3. In the portion of the connection region D3 closest to the second region D2, the protrusion amount H1 of the first ribs 140 and 150 is minimum (0), and is in the state shown in FIG. 4.

Further, the protrusion amount H2 of the second ribs 240 and 250 gradually increases as going from the first region D1 side to the second region D2 side. In the portion of the connection region D3 closest to the first region D1, the protrusion amount H2 of the second ribs 240 and 250 is minimum (0), and is in the state shown in FIG. 3. In the portion of the connection region D3 closest to the second region D2, the protrusion amount H2 of the second ribs 240 and 250 is maximum, and is in the state shown in FIG. 4.

Based on such a configuration described above, the first region D1 and the second region D2 which are different from each other in the joint structure are smoothly connected to each other via the connection region D3. Therefore, in comparison with the structure in which both of them are connected discontinuously connected, it is possible to prevent the members from colliding with each other at a discontinuous portion (for example, a step portion) during the vibration welding.

In the first region D1 according to the present embodiment, two first ribs 140 and 150 are formed so as to sandwich the first welded portion 130 therebetween, but only one of the first rib 140 and the first rib 150 may be provided, and the other rib may not be provided. For example, in order to hide the burr formed in the welded portion to enhance the design of the bonded body 10, the first rib 150 may be provided on the outer side, and the first rib 140 may not be provided on the inner side. In addition, when the burr generated in the welded portion is prevented from falling into the inside of the bonded body 10 (that is, the air passage), the first rib 140 is provided on the inner side, and the first rib 150 may not be provided on the outer side.

Similarly, in the second region D2 according to the present embodiment, two second ribs 240 and 250 are formed so as to sandwich the second welded portion 230 therebetween, but only one of the second rib 240 and the second rib 250 may be provided, and the other rib may not be provided. For example, in order to hide the burr formed in the welded portion to enhance the design of the bonded body 10, the second rib 250 may be provided on the outer side, and the second rib 240 may not be provided on the inner side. In addition, when the burr generated in the welded portion is prevented from falling into the inside of the bonded body 10 (that is, the air passage), the second rib 240 is provided on the inner side, and the second rib 250 may not be provided on the outer side.

A second embodiment will be described. Hereinafter, only parts different from the first embodiment will be described, and description of parts common to the first embodiment will be omitted for explanation as appropriate.

Figure 10:
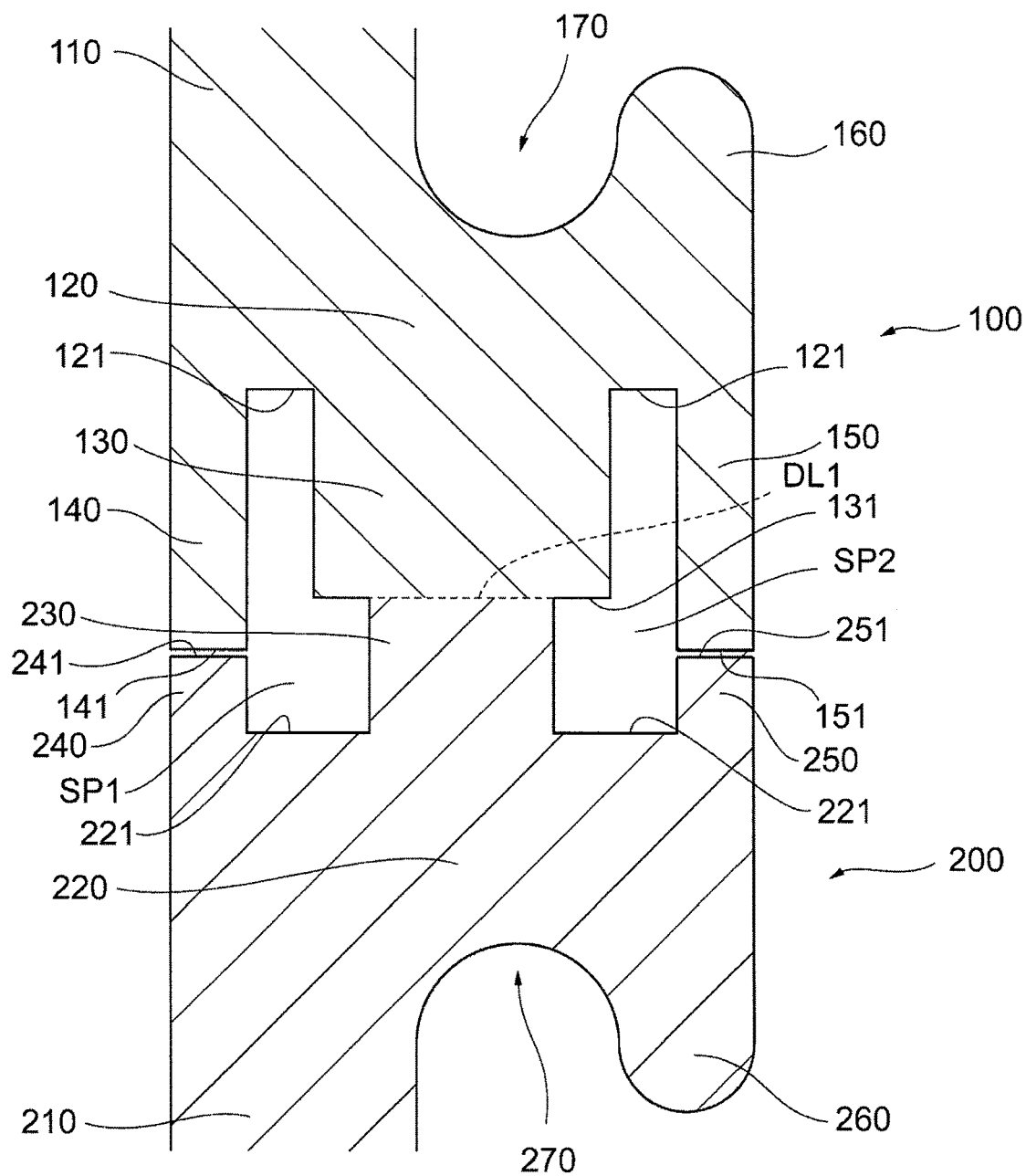
FIG. 10 is a cross-sectional view of the bonded body according to a second embodiment.

FIG. 10 shows a joint structure of the first region D1 in the present embodiment as a cross section at the same position as FIG. 3. As shown in the FIG. 10, in the bonded body 10 according to the present embodiment, the second ribs 240 and 250 are formed in the second member 200 in the first region D1 in the same manner as in the second region D2. The amount of protrusion (the dimension along the z axis) of the second ribs 240 and 250 in the first region D1 is smaller than the amount of protrusion of the second welded portion 230.

The distal end surface 141 of the first rib 140 faces the distal end surface 241 of the second rib 240, and a slight gap is formed between the distal end surface 141 and the distal end surface 241. Therefore, the first rib 140 in the present embodiment also covers the first welded portion 130 and the second welded portion 230, which are bonded to each other, from the side (the −y direction side) in the first region D1.

The distal end surface 151 of the first rib 150 faces the distal end surface 251 of the second rib 250, and a slight gap is formed between the distal end surface 151 and the distal end surface 251. Therefore, the first rib 150 in the present embodiment also covers the first welded portion 130 and the second welded portion 230, which are bonded to each other, from the side (the y direction side) in the first region D1.

Figure 11:
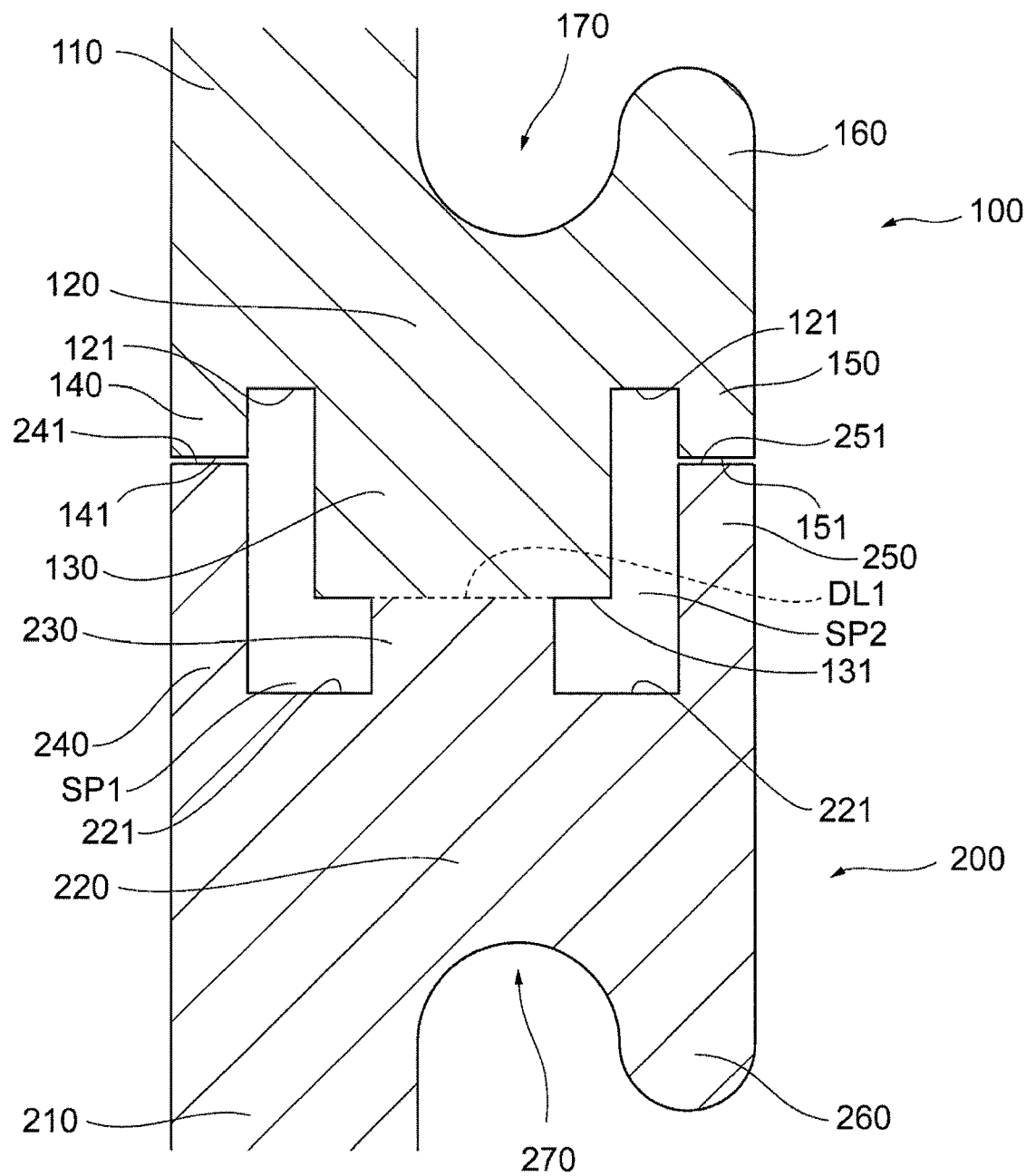
FIG. 11 is a cross-sectional view of the bonded body according to a second embodiment.

FIG. 11 shows a joint structure of the second region D2 in the present embodiment as a cross section at the same position as FIG. 4. As shown in the FIG. 11, in the bonded body 10 according to the present embodiment, the first ribs 140 and 150 are formed in the first member 100 in the second region D2 in the same manner as in the first region D1. The amount of protrusion (the dimension along the z axis) of the first ribs 140 and 150 in the second region D2 is smaller than the amount of protrusion of the first welded portion 130.

The distal end surface 241 of the second rib 240 faces the distal end surface 141 of the first rib 140, and a slight gap is formed between the distal end surface 241 and the distal end surface 141. Therefore, the second rib 240 in the present embodiment also covers the first welded portion 130 and the second welded portion 230, which are bonded to each other, from the side (the −y direction side) in the second region D2. Since the distal end surface 241 and the distal end surface 141 face each other in a state where they are close to each other, the burr contained in the space SP1 is not visually recognized from the outside.

It is preferable that the size of the gap formed between the distal end surface 241 and the distal end surface 141 is such that the burr in the space SP2 does not protrude to the outside. The distal end surface 241 and the distal end surface 141 may be in contact with each other.

Further, the distal end surface 251 of the second rib 250 is in contact with the distal end surface 151 of the first rib 150. Therefore, the second rib 250 in the present embodiment also covers the first welded portion 130 and the second welded portion 230, which are bonded to each other, from the side (the y direction side) in the second region D2. Since the distal end surface 251 and the distal end surface 151 face each other in a state where they are close to each other, the burr contained in the space SP2 is not visually recognized from the outside.

It is preferable that the size of the gap formed between the distal end surface 251 and the distal end surface 151 is such that the burr in the space SP2 does not protrude to the outside. The distal end surface 251 and the distal end surface 151 may be in contact with each other.

The above described configuration also achieves the same effects as those described in the first embodiment can be obtained. Further, in the above configuration, the length of each of the first ribs 140 and 150 in the first region D1 can be made shorter than those of the first embodiment. Similarly, the length of each of the second ribs 240 and 250 in the second region D2 can be made shorter than those in the first embodiment. Therefore, the advantage of increasing the strength of each of the first ribs 140, 150 and the second ribs 240, 250 can be obtained.

A third embodiment will be described with reference to FIGS. 12 and 13. The bonded body 10A according to the third embodiment is a container having a substantially rectangular parallelepiped shape, and a space (not shown) is formed inside of the container. The bonded body 10A is formed by vibration welding a first member 100A and a second member 200A which are previously formed by injection molding of resin.

Figure 12:
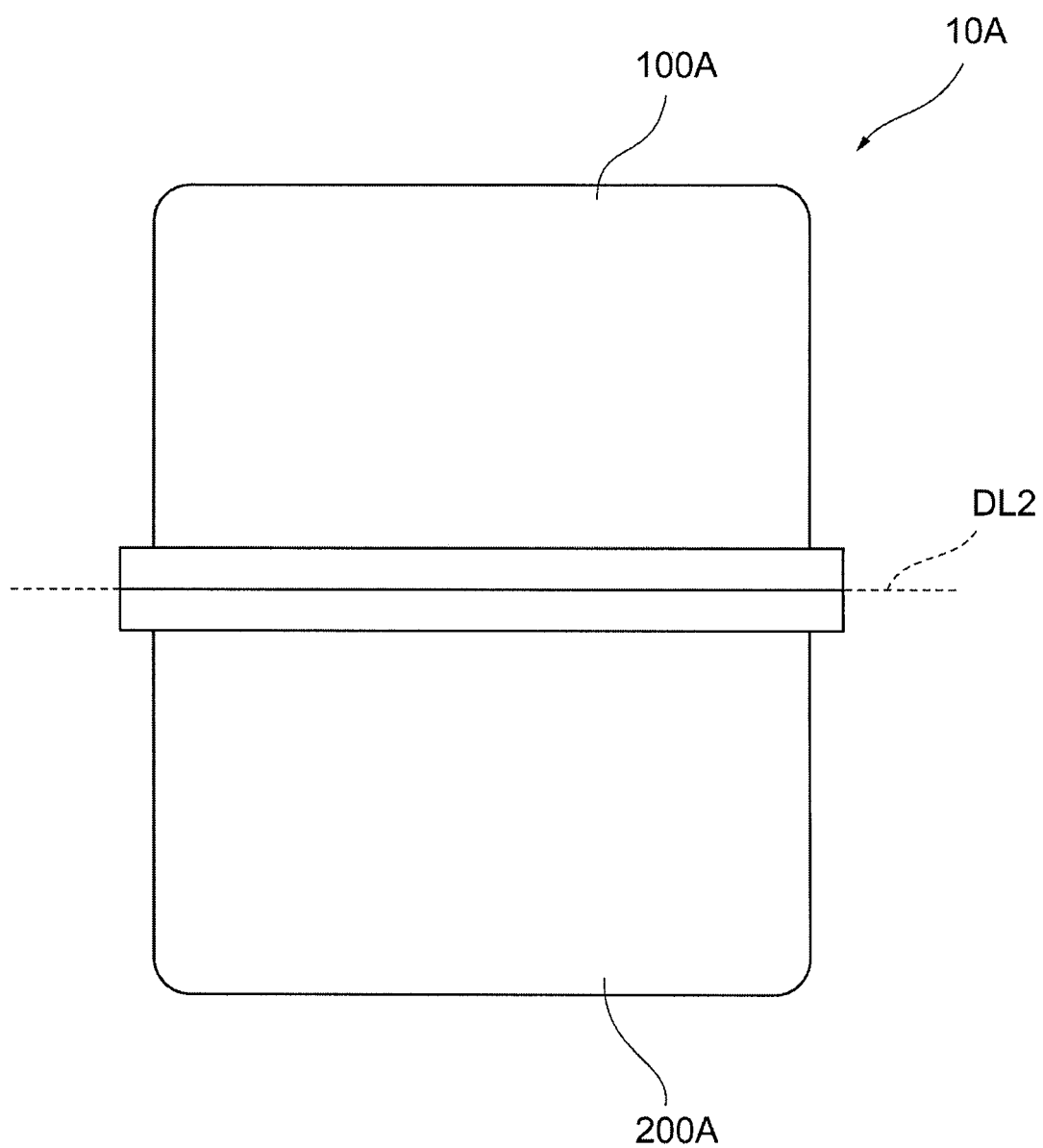
FIG. 12 is a side view showing an entire structure of a bonded body according to a third embodiment.

The first member 100A is a container in which a lower end in FIG. 12 is opened before bonding. The second member 200A is a container in which an upper end in FIG. 12 is opened before bonding. The first member 100A and the second member 200A are vibration-welded in a state in which the edges at the respective open ends are abutted against each other. In FIG. 12, a boundary surface between the first member 100A and the second member 200A is indicated by a dotted line DL2. The above boundary surface is a surface different from the bonding surface due to vibration welding (the dotted line DL1 in FIGS. 3 and 4).

Figure 13:
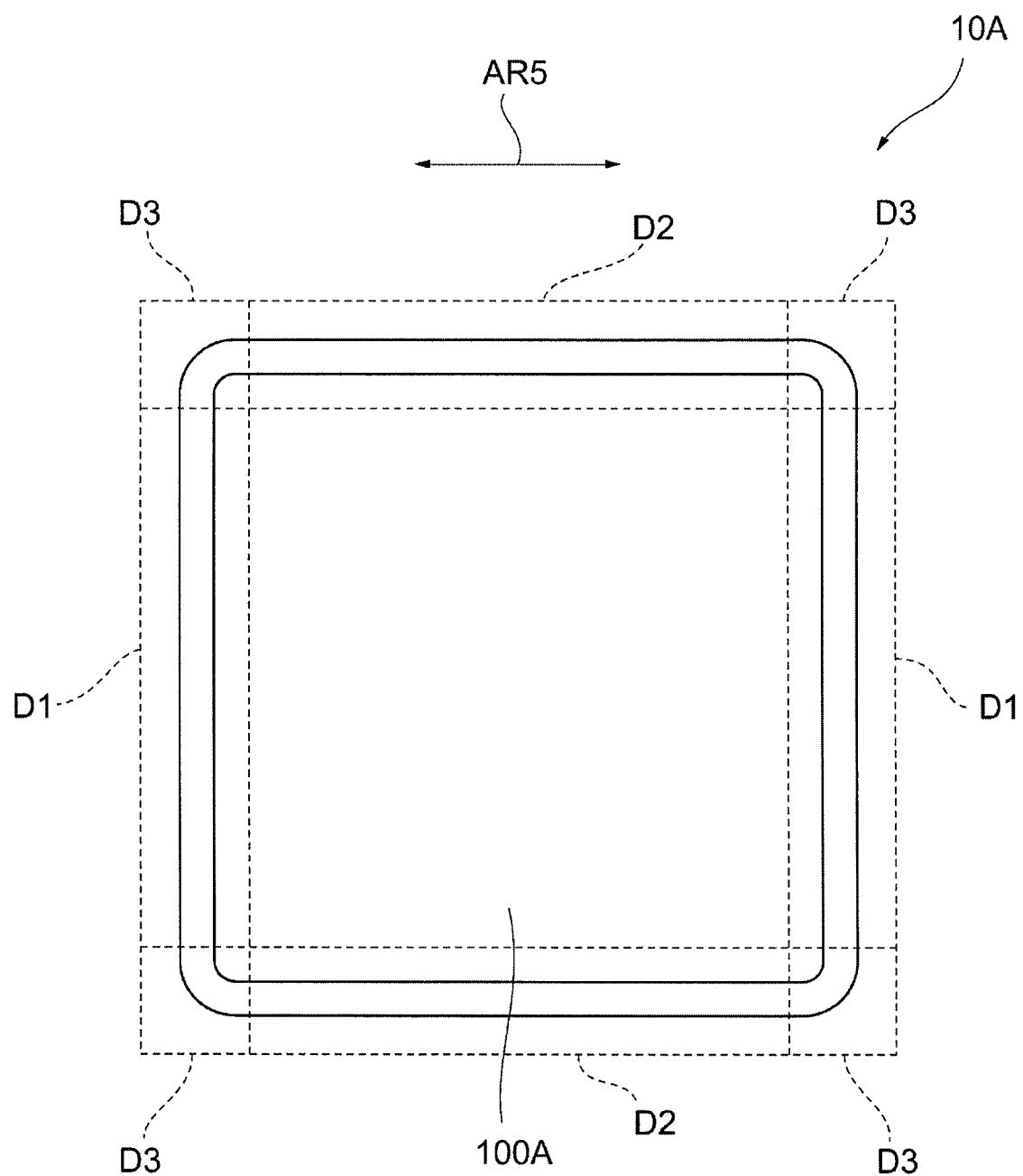
FIG. 13 is a top view showing the entire structure of the bonded body according to the third embodiment.

In FIG. 13, the bonded body 10A as viewed along the direction from the first member 100A toward the second member 200A (that is, the −z direction) is depicted. The vibration direction at the time of vibration welding is the direction indicated by the arrow AR5 in FIG. 13.

In the first region D1 shown in FIG. 13, the direction in which the joint portion between the first member 100A and the second member 200A extends (that is, the vertical direction in FIG. 13) is perpendicular to the vibration direction at the time of the vibration welding. The structure of the joint portion between the first member 100A and the second member 200A in the first region D1 is the same as that described with reference to FIG. 3. That is, the ribs (first ribs 140 and 150) covering the joint portion from the side are provided on the member side (the first member 100A side) having the wider welded portion (first welded portion 130).

In the second region D2 shown in FIG. 13, the direction in which the joint portion between the first member 100A and the second member 200A extends (that is, the lateral direction in FIG. 13) is parallel to the vibration direction at the time of the vibration welding. The structure of the joint portion between the first member 100A and the second member 200A in the second region D2 is the same as that described with reference to FIG. 4. That is, the ribs (second ribs 240 and 250) covering the joint portion from the side are provided on the member side (the second member 200A side) having the narrower welded portion (the second welded portion 230).

A connection region D3 shown in FIG. 13 is a region connecting the first region D1 and the second region D2 as described above. The structure of the joint portion between the first member 100A and the second member 200A in the connection region D3 is the same as that described with reference to FIG. 9. That is, the height of the ribs (first ribs 140 and 150 and second ribs 240 and 250) covering the welded portion from the side gradually changes from the first region D1 side to the second region D2 side.

Also in the bonded body 10A having the above configuration, the same effects as those described in the first embodiment can be obtained.

The embodiments have been described with reference to specific examples above. However, the present disclosure is not limited to these specific examples. Those skilled in the art appropriately design modifications to these specific examples, which are also included in the scope of the present disclosure as long as they have the features of the present disclosure. The elements, the arrangement, the conditions, the shape, etc. of the specific examples described above are not limited to those exemplified and can be appropriately modified. The combinations of elements included in each of the above described specific examples can be appropriately modified as long as no technical inconsistency occurs.

In an assumable example where a product having a relatively complicated shape is formed by resin such as an intake manifold, a plurality of members are formed in advance, and it is common to form the product (bonded body) by vibration welding these members. The intake manifold has a structure in which two divided bodies each having a projecting portion formed on part thereof are subjected to vibration welding in a state in which the tips of the projecting portions are butted to each other.

When the vibration welding is performed, it is known that burrs occur at the welded portion, and that the burrs grow gradually. In order to prevent part of the burr from peeling off and falling into or around the product, the above intake manifold has a rib (cover wall) that covers the periphery of the welded portion. The rib is previously formed on at least one of the divided bodies before the vibration welding is performed. In addition, the above ribs may be provided for the purpose of concealing the welded portion and improving a design.

For convenience of explanation, in the following, one of the members to be vibration-welded is referred to as a "first member", and the other is referred to as a "second member". Further, a portion of the first member which protrudes toward the second member and whose tip is vibration-welded is hereinafter referred to as a "first welded portion". Furthermore, a portion of the second member that protrudes toward the first member and whose tip is vibration-welded is hereinafter referred to as a "second welded portion".

In the intake manifold, a width of the first welded portion is larger than a width of the second welded portion. In such a configuration, vibration welding can be performed while maintaining a state in which a entire distal end surface of the second welded portion is always in contact with a distal end surface of the first welded portion. Thereby, it is prevented that a bonding failure arises near an outer peripheral part of the joint portion.

The rib of the intake manifold described above is provided on the second member, and is provided so as to cover the first welded portion and the second welded portion from the side. When the vibration welding is performed, a state in which the side surface of the first welded portion is close to the rib and a state in which the side surface of the first welded portion is moved away from the rib are repeated due to the vibration of the member.

In order to reduce the size of the product (bonded body), it is preferable to make the distance between the first welded portion and the rib as small as possible. However, if the distance is too small, the movable range (that is, the amplitude of the vibration) at the time of vibration welding becomes smaller due to the interference between the two, so that there is a possibility that the bonding strength between the first member and the second member is lowered.

In particular, in the intake manifold, the width of the first welded portion on the first member having no rib is increased, and as a result, the distance between the first welded portion and the rib is reduced from the beginning. Therefore, it is difficult to further miniaturize the product by reducing the distance.

Therefore, the present inventor has studied that the rib which covers the first welded portion and the second welded portion from the side is not provided to the second member having the second welded portion with a narrow width, but is provided to the first member having the first welded portion with a wide width. With such a configuration, it is possible to reduce the size of the bonded body while sufficiently securing the movable range at the time of the vibration welding.

However, if the above configuration is adopted in all of the parts where the first member and the second member are joined to each other, the present inventor found a new problem that a part of the burr generated at the time of vibration welding may protrude to the outside of the rib. Such a phenomenon is particularly likely to occur in a region in which the direction where the joint portion between the first member and the second member extends is parallel to the direction of vibration during the vibration welding. As the reason, in the above region, the growth direction of the burr is not determined in a fixed direction, so that depending on the growth direction, part of the burr may protrude from the gap formed on a distal end side of the rib.

An object of the present disclosure is to provide a bonded body capable of preventing a phenomenon in which the burr protrudes to the outside of the rib.

The bonded body according to the present disclosure is a bonded body (10) formed by vibration welding a first member (100) and a second member (200). The first member includes a first base portion (120) extending along an edge on a second member side of the first member, and a first welded portion (130) projecting from the first base portion toward the second member side. The second member includes a second base portion (220) extending along an edge on a first member side of the second member and arranged to face the first base portion, and a second welded portion (230) projecting from the second base portion toward the first member side and having a tip end vibration welded to a tip end of the first welded portion. A width of the first welded portion is larger than a width of the second welded portion. In a first region (D1) of the portion where the first member and the second member are joined, a first rib (140, 150) formed in the first member so as to protrude from the first base portion toward the second member side at a position separated from the first welded portion, covers the first welded portion and the second welded portion from the side. In a second region (D2) different from the first region in the portion where the first member and the second member are joined, a second rib (240, 250) formed in the second member so as to protrude from the second base portion to the first member side at a position separated from the second welded portion, covers the first welded portion and the second welded portion from the side.

In the bonded body having such a configuration, the width of the first welded portion is larger than the width of the second welded portion. Therefore, in the case of vibration welding, the entire distal end surface of the second welded portion is always in contact with the distal end surface of the first welded portion. Thereby, it is prevented that a bonding failure arises near an outer peripheral part of the joint portion.

In the first region, the rib which covers the first welded portion and the second welded portion from the side is provided to the first member having the first welded portion with the wide width. Therefore, the distance between the first weld portion and the rib is small, but since the distance does not change due to vibration, the first weld portion and the rib do not interfere with each other. Therefore, the distance can be further reduced in order to miniaturize the bonded body.

On the other hand, since the width of the second welded portion is narrow, the distance between the second welded portion and the rib is relatively large in the first region. Therefore, as described above, even when the distance between the first welded portion and the rib is reduced to miniaturize the overall size, the distance between the second welded portion and the rib does not become too small. Since the movable range at the time of vibration welding is sufficiently secured, it is possible to reduce the size of the bonded body while preventing a bonding strength from being lowered.

By the way, the range in which the burr may grow and extend during the vibration welding is a range closer to the second member than the distal end surface of the first welded portion with a wide width. In the first region, the gap formed on the distal end side of the rib is included in the above range. Therefore, some of the burrs may grow toward the gap on the distal end side of the rib and may protrude to the outside of the rib. However, when the burr grows along the distal end surface of the first welded portion, the burr hits the inner surface of the rib, and the possibility of protruding to the outside of the rib becomes low.

On the other hand, in the second region, the gap formed on the distal end side of the rib is not included in the above range. Therefore, even if the burr grows in any direction, there is no possibility that the burr will protrude to the outside of the rib.

Therefore, when a region in which burr easily grows along the distal end surface of the first welded portion is defined as the above mentioned first region, and a region in which the direction in which the burrs grow is difficult to be constant is defined as the above mentioned second region, it is possible to prevent the phenomenon that burr protrudes to the outside of the rib while reducing the size of a part of the bonded body. The "region where burr is likely to grow along the distal end surface of the first welded portion" is a region where the direction in which the joint portion between the first member and the second member extends is perpendicular to the vibration direction at the time of the vibration welding, for example. Further, "a region where the direction in which the burr grows does not easily become constant" is a region where the direction in which the joint portion between the first member and the second member extends is parallel to the vibration direction at the time of the vibration welding, for example.

According to the present disclosure, it is possible to provide a bonded body capable of preventing a phenomenon in which a burr protrudes to the outside of the rib.

The invention claimed is:

1. A bonded body, comprising:
   a first member; and
   a second member performing a vibration welding with the first member so as to form the bonded body, wherein
   the first member includes
      a first base portion extending along an edge on the second member side of the first member, and
      a first welded portion protruding from the first base portion toward a second member side,
   the second member includes
      a second base portion extending along an edge on the first member side of the second member and disposed to face the first base portion, and
      a second welded portion protruding from the second base portion toward a first member side and having a distal end which is vibration welded to the tip of the first welded portion,
   a width of the first welded portion is larger than a width of the second welded portion,
   in a first region of the portion where the first member and the second member are joined, a first rib formed on the first member so as to protrude from the first base portion toward the second member side at a position separated from the first welded portion, covers the first welded portion and the second welded portion from the side,
   in a second region different from the first region, in the portion where the first member and the second member are joined, a second rib formed on the second member so as to protrude from the second base portion toward the first member side at a position separated from the second welded portion, covers the first welded portion and the second welded portion from the side, and
   in a connection region connecting the first region and the second region in a portion where the first member and the second member are joined,
   the first rib and the second rib are formed so that the amount of protrusion of the first rib gradually decreases and the amount of protrusion of the second rib gradually increases from the first region side to the second region side.

2. The bonded body according to claim 1, wherein
   in the first region, the second rib is formed on the second member,
   in the second region, the first rib is formed on the first member.

3. The bonded body according to claim 2, wherein
   a distal end of the first rib and a distal end of the second rib are opposed to each other.

4. The bonded body according to claim 1, wherein
   two of the first ribs are provided so as to sandwich the first welded portion therebetween, and
   two of the second ribs are provided so as to sandwich the second welded portion therebetween.

* * * * *